US010538069B2

(12) United States Patent
Iwaki

(10) Patent No.: US 10,538,069 B2
(45) Date of Patent: Jan. 21, 2020

(54) MEDICAL PACKAGING FILM

(71) Applicant: AICELLO CORPORATION, Aichi (JP)

(72) Inventor: Banri Iwaki, Aichi (JP)

(73) Assignee: AICELLO CORPORATION, Aichi (JP)

( * ) Notice: Subject to any disclaimer, the term of this patent is extended or adjusted under 35 U.S.C. 154(b) by 0 days.

(21) Appl. No.: 16/097,372

(22) PCT Filed: May 8, 2017

(86) PCT No.: PCT/JP2017/017411
§ 371 (c)(1),
(2) Date: Oct. 29, 2018

(87) PCT Pub. No.: WO2017/195736
PCT Pub. Date: Nov. 16, 2017

(65) Prior Publication Data
US 2019/0143651 A1 May 16, 2019

(30) Foreign Application Priority Data

May 9, 2016 (JP) ................................. 2016-094198

(51) Int. Cl.
*B32B 27/18* (2006.01)
*B32B 27/32* (2006.01)
(Continued)

(52) U.S. Cl.
CPC .............. *B32B 27/08* (2013.01); *B32B 27/18* (2013.01); *B32B 27/32* (2013.01); *B32B 27/325* (2013.01);
(Continued)

(58) Field of Classification Search
CPC ......... B27B 2307/21; B27B 2439/00–2439/80
See application file for complete search history.

(56) References Cited

U.S. PATENT DOCUMENTS

2006/0057318 A1* 3/2006 Tachino .................... B32B 7/02
428/35.2
2006/0142489 A1 6/2006 Chou et al.

FOREIGN PATENT DOCUMENTS

CN 101052682 A 10/2007
CN 103029389 A 4/2013
(Continued)

OTHER PUBLICATIONS

Machine translation of JP 11-147,288A (Year: 1999).*
(Continued)

*Primary Examiner* — Ramsey Zacharia
(74) *Attorney, Agent, or Firm* — Sughrue Mion, PLLC

(57) ABSTRACT

The present invention relates to a medical packaging film containing a laminate of a first layer formed of a no-antistatic agent-containing thermoplastic resin formation layer; a second layer formed of a polymer antistatic agent-containing thermoplastic resin formation layer containing a potassium ionomer in an amount of C wt % (10<C<30); and a third layer formed of the thermoplastic resin formation layer, and the laminate provides an amount of a water-elutable alkali component being at most 0.01 mmol equivalent per g in total of 1 cm² pieces, and in which the first layer has a thickness of $L_1$ m, and the second layer has a potassium ionomer concentration of $C'_2$ vol % and a thickness of $L_2$ m, satisfying the formula $2 \leq L_1 \leq (5 \times L_2 \times C'_2)/100+5$.

11 Claims, 3 Drawing Sheets

(51) Int. Cl.
*B65D 65/40* (2006.01)
*B32B 27/08* (2006.01)
*B32B 27/34* (2006.01)

(52) U.S. Cl.
CPC .............. *B32B 27/34* (2013.01); *B65D 65/40* (2013.01); *B32B 2250/05* (2013.01); *B32B 2250/242* (2013.01); *B32B 2307/21* (2013.01); *B32B 2439/46* (2013.01); *B32B 2439/80* (2013.01)

(56) References Cited

FOREIGN PATENT DOCUMENTS

| | | |
|---|---|---|
| JP | 8-502532 A | 3/1996 |
| JP | 10-193945 A | 7/1998 |
| JP | 11-147288 A | 6/1999 |
| JP | 2003-080649 A | 3/2003 |
| JP | 2004-217759 A | 8/2004 |
| JP | 2006-035848 A | 2/2006 |
| JP | 2009-138139 A | 6/2009 |
| WO | 94/09060 A1 | 4/1994 |
| WO | 2008/099445 A1 | 8/2008 |

OTHER PUBLICATIONS

Notification of Reasons for Refusal dated Jul. 26, 2016 issued by the Japanese Patent Office in counterpart Japanese Application No. 2016-094198.

Written Opinion (PCT/ISA/237) dated Aug. 1, 2017 issued by the International Searching Authority in International Application No. PCT/JP2017/017411.

International Search Report (PCT/ISA/210) dated Aug. 1, 2017 issued by the International Searching Authority in International Application No. PCT/JP2017/017411.

Extended European Search Report dated Nov. 29, 2019, issued by the European Patent Office in corresponding European Application 17796097.8.

\* cited by examiner

[FIG. 1]
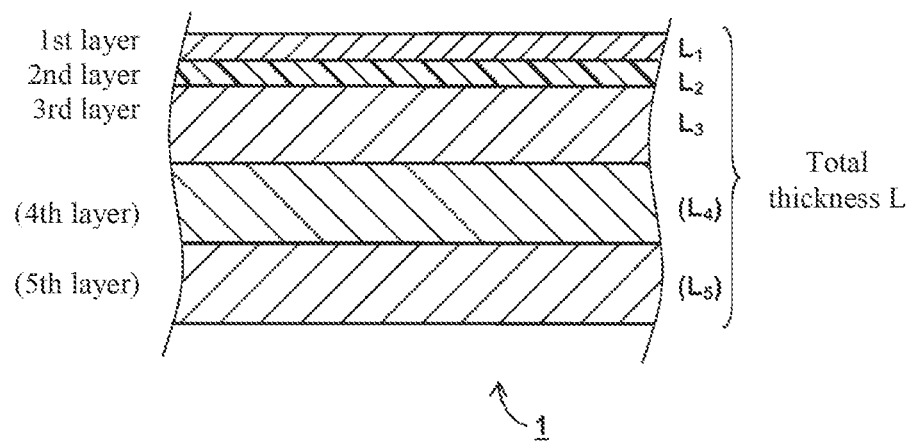
[FIG. 2]
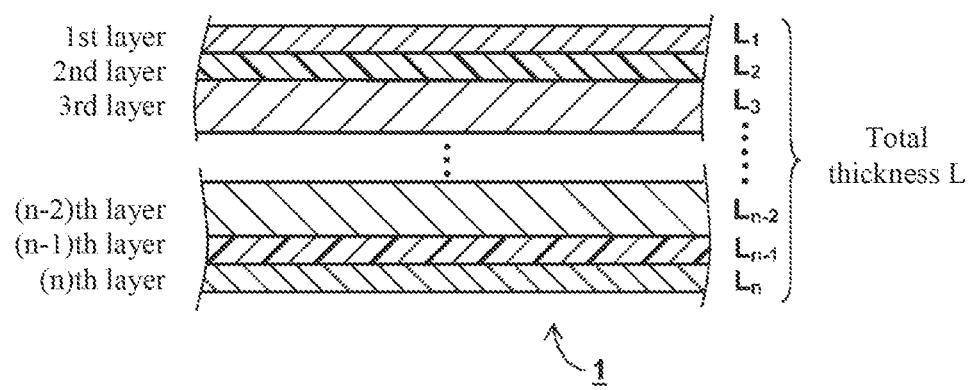

[FIG. 3]
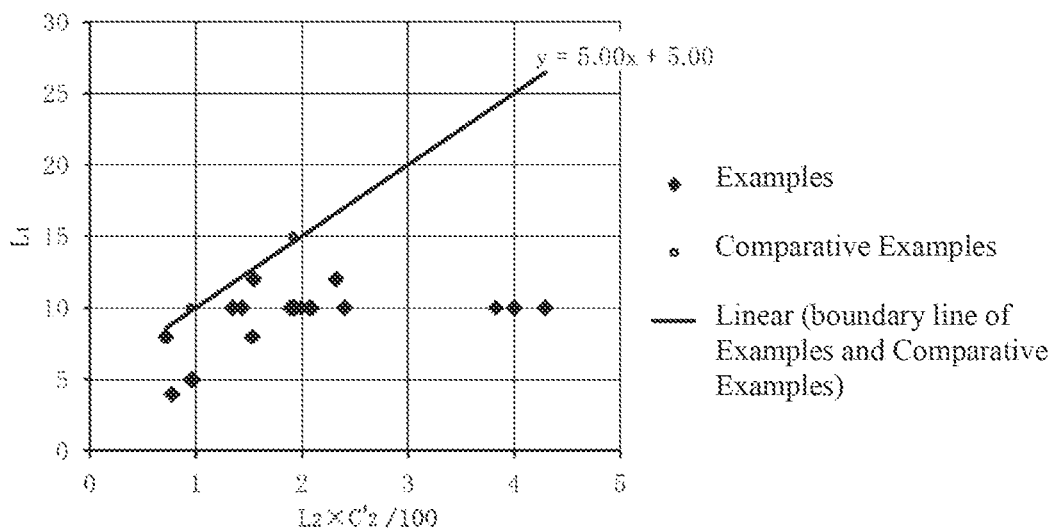
[FIG. 4]
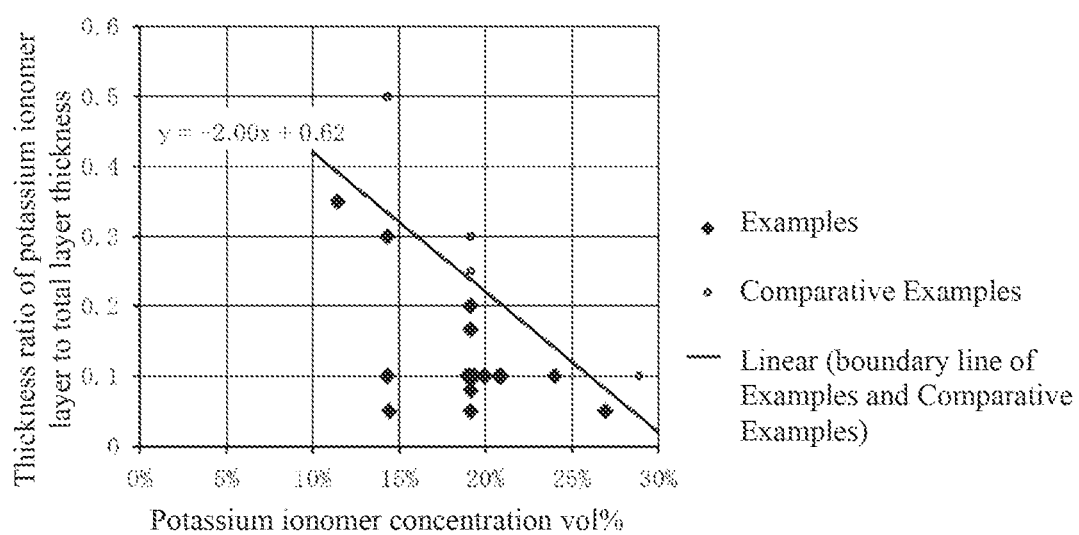

[FIG. 5]
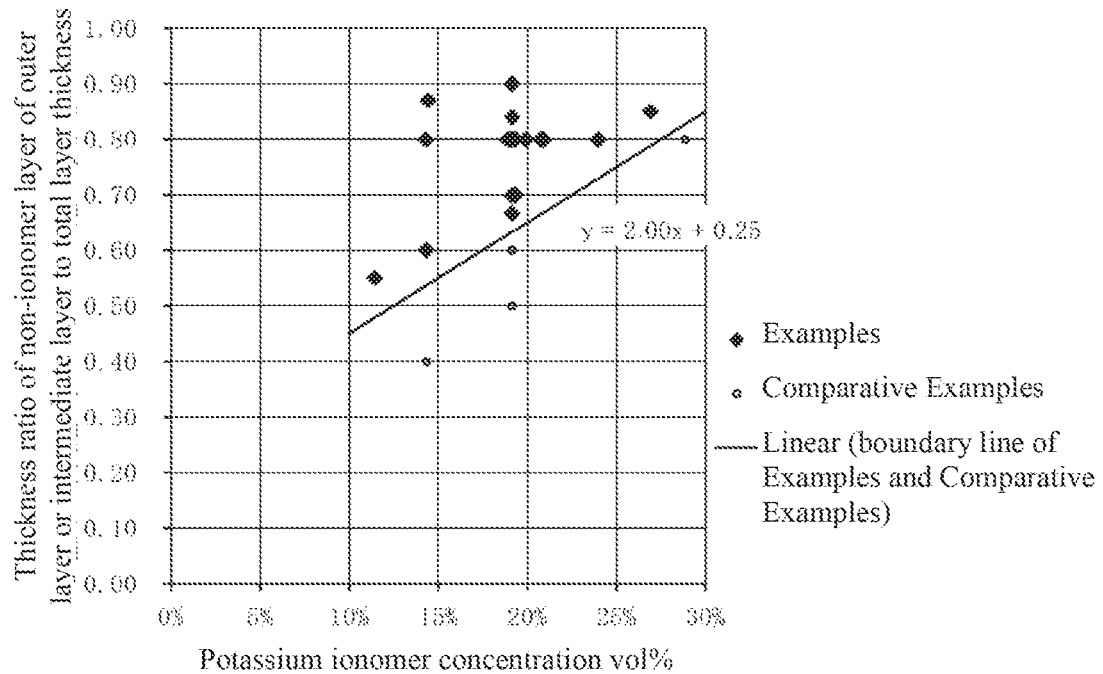

MEDICAL PACKAGING FILM

TECHNICAL FIELD

The present invention relates to a medical packaging film for packaging a medicine or a drug substance thereof while maintaining an antistatic property.

BACKGROUND ART

Packaging film of polyolefin or the like, for packaging a medicine or a drug substance thereof, is sometimes required to conform to a country-specific pharmacopeia, such as Japanese Pharmacopeia or European Pharmacopeia, in producing a medical drug. Close attention has been paid to prevent a medicine or a drug substance thereof from contamination caused by a bleed-out and incorporation of impurities inside of a packaging film, or caused by an incorporation of dust electrostatically adsorbed on the surface of a packaging film.

At the present time, in a drug substance manufacturer of a medicine and in a pharmaceutical manufacturer, use can be made of; a sheet-shape packaging film formed of a resin having added thereto a surfactant that does not affect components of a medicine, in order to prevent contamination during transportation between factories or during transfer between processes inside a factory; a sheet-shape packaging film formed of a resin free of a surfactant for avoiding bleed-out: or a bag-shape packaging film formed by those.

The sheet-shape or bag-shape packaging films have various sizes such as a size for packaging a drug substance powder of several 100 g unit, a size for packaging a bag for packaging a drug substance powder and accommodating it in a drum can, and a size for packaging a drug substance powder of at most about 200 kg.

A drug substance of a medicine is mainly a granular powder. In a sheet-shape or bag-shape packaging film made of a resin to which no antistatic function is imparted, there is a possibility that an accident of dust explosion occurs. Therefore, a packaging film having added thereto additives described in a positive list related to foodstuffs or a packaging film having an antistatic function conforming to a country-specific pharmacopeia including Japanese Pharmacopeia, is sometimes required.

A packaging film formed of a resin having added thereto a surfactant to impart an antistatic function has been known. However, humidity affects the surfactant to exhibit an antistatic function, and the antistatic function may be deteriorated in a low humidity environment. Furthermore, bleed-out or elution of the surfactant may adversely affect a medical drug to be packaged or the antistatic function may be deteriorated with the lapse of time. For these reasons, a packaging film formed of a resin having added thereto a polymer antistatic agent is preferably used in order to eliminate those demerits of the surfactant.

Antistatic film containing a potassium ionomer as such a polymer antistatic agent has been known. In the case where the antistatic film is a multilayer film using a potassium ionomer and has an ionomer-containing layer as the innermost layer in contact with contents, the amount of a water-elutable alkali component is increased and thus, the antistatic film does not conform to a country-specific pharmacopeia including European Pharmacopeia.

As an antistatic film that is a multilayer film using a potassium ionomer and has an ionomer-containing layer in an inner layer that is not in direct contact with contents, Patent Literature 1 discloses a dust-proof laminate containing at least three layers in which at least one layer of surface layers is a thermoplastic resin layer, in which the laminate contains a non-electrostatically chargeable layer, containing (A) a thermoplastic resin, (B) a potassium ionomer of an ethylene-unsaturated carboxylic acid copolymer and (C) a polyhydroxyl compound, and provided in an intermediate layer adjacent to the thermoplastic layer.

Patent Literature 2 discloses a laminate having at least three layers, in which both surface layers thereof are constituted of a polymeric material having a surface resistivity of $1\times10^{14}\Omega$ or more, an intermediate layer is constituted of a potassium ionomer of an ethylene-unsaturated carboxylic acid copolymer or of a mixture of the potassium ionomer and a thermoplastic monomer, and at least one layer of the surface layers has a 10% attenuation time of 20 seconds or less at an applied voltage of +5,000V measured in the atmosphere of 2.3° C. and a relative humidity of 50%.

Patent Literatures 1 and 2 do not show that these laminates can be applied to a medicine packaging and do not show specific component, constituents and adjustment of layer constituent components for achieving the application. Furthermore, in the case of having an ionomer-containing layer as an intermediate layer, there is no known laminate conforming to a country-specific pharmacopeia including European Pharmacopeia, even though a thickness of an innermost, layer or an inner layer is controlled, the amount of a potassium ionomer is adjusted and components are selected.

CITATION LIST

Patent Literature

Patent Literature 1: JP-A H10-193945
Patent Literature 2: JP-A 2003-80649

SUMMARY OF INVENTION

Technical Problem

The present invention has been made to solve the above problems, and has an object to provide a medical packaging film for packaging and accommodating a medicine or a drug substance thereof for storage and transportation of those while maintaining high quality. The medical packaging film has a sufficient antistatic function imparted, is applicable to large weight packaging of a medicine and the like, satisfies an elutable alkali component specified as an alkali test in European Pharmacopeia and the like within the standard, and reduces an amount of an ignition residue, which is contained as an inorganic substance and remained by an ignition residue test, to satisfy within the standard.

Solution to Problem

The medical packaging film of the present, invention that has been made to achieve the above object is a medical packaging film containing a laminate of at least three thermoplastic resin formation layers, in which the laminate contains: a first layer that is an innermost layer in contact with a medicine and formed of a no-antistatic agent-containing thermoplastic resin formation layer; a second layer formed of a polymer antistatic agent-containing thermoplastic resin formation layer containing a polymer antistatic agent that is a potassium ionomer in an amount of C wt % ($10<C<30$) in a single layer; and a third layer that is an outermost layer formed of the thermoplastic resin formation layer or layers from the third layer to an outermost layer, and the laminate provides an amount of a water-elutable alkali component being at most 0.01 mmol equivalent per 5 g in total of 1 cm² pieces, and in which the first layer has a thickness of $L_1$ μm, the second layer has a potassium ionomer concentration of $C'_2$ vol % and the second layer has a thickness of $L_2$ μm, satisfying the following formula (1).

$$2 \leq L_1 \leq (5 \times L_2 \times C'_2)/100 + 5 \quad (1)$$

The medical packaging film of the present invention contains an elutable alkali component in a range such that the amount of a water-eluable alkali component is 0.01 mmol equivalent or less by adjusting an acid titer, which is obtained by preparing a solution by extracting 25 g in total of 1 cm² pieces of the laminate with 500 mL of water and titrating 100 ml of the solution with 0.01 N hydrochloric acid solution, to be at most 1.0 mL.

The medical packaging film of the present invention is further preferably that, the polymer antistatic agent is a potassium ionomer of an ethylene-unsaturated carboxylic acid copolymer in which ethylene is copolymerized with an unsaturated carboxylic acid.

The medical packaging film of the present, invention is, for example, that the laminate is a laminate of from three to five thermoplastic resin formation layers and only the second layer contains the potassium ionomer.

In such a case, the medical packaging film is preferably that the first layer has the thickness of $L_1$ μm; the second layer contains a base resin having a density of $D_{2b}$ g/cm³ and the potassium ionomer having a density of $D_2$ g/cm³ and having concentrations of $C_2$ wt % and $C'_2$ vol %; and the second layer has the thickness of $L_2$ μm, satisfying the above formula (1) and the following formula (2).

$$C'_2/100 = (C_2/D_2)/[(100-C_2)/D_{2b} + C_2/D_2] \quad (2)$$

The medical packaging film of the present invention may be, for example, that the laminate is a laminate of at least five thermoplastic resin formation layers and each of the second layer and (n−1)th layer in contact with the inside of (n)th layer that is the outermost layer contains the potassium ionomer in an amount of C wt % (10<C<30) in a single layer.

In such a case, the medical packaging film is preferably that the first layer has the thickness of $L_1$ μm; the second layer contains a base resin having a density of $D_{2b}$ g/cm¹ and the potassium ionomer having a density of $D_2$ g/cm³ and having concentrations of $C_2$ wt % and $C'_2$ vol %; and the second layer has the thickness of $L_2$ μm, satisfying the above formula (1) and the following formula (2), and that the (n)th layer has a thickness of $L_n$ μm; the (n−1)th layer contains a base resin having a density of $D_{(n-1)b}$ g/cm³ and the potassium ionomer having a density of $D_{n-1}$ g/cm³ and having concentrations of $C_{n-1}$ wt % and $C'_{n-1}$ vol %; and the (n−1)th layer has a thickness of $L_{n-1}$ μm, satisfying the following formula (3) and formula (4).

$$C'_2/100 = (C_2/D_2)/[(100-C_2)/D_{2b} + C_2/D_2] \quad (2)$$

$$2 \leq L_1 \leq (5 \times L_2 \times C'_2)/100 + 5 \quad (1)$$

$$C'_{n-1}/100 = (C_{n-1}/D_{n-1})/[(100-C_{n-1})/D_{m-1)b} + C_{n-1}/D_{n-1}] \quad (4)$$

The medical packaging film of the present invention preferably shows an ignition residue of almost 1%.

The medical packaging film of the present invention is preferably that the laminate has the innermost layer having a surface resistivity of less than $10^{14}Ω$, an electrostatic potential of at most 1.0 kV and a half-life thereof of at most 60 seconds.

The medical packaging film of the present invention is preferably that the laminate has a peeling strength such that when the innermost layer is heat-sealed to itself with a width of 15 mm to prepare a test piece of the laminate and a load of 1 kg is attached to one side of the test piece, the innermost layer does not peel apart after being allowed to stand for 48 hours.

The medical packaging film of the present, invention is preferably that, the thicknesses of the first layer and the second layer are thinner than at least one of the thickness of any one of the other layers and the total thickness of the other layers.

The medical packaging film of the present invention is, for example, that the laminate is used as a packaging sheet or one or two of the laminates are heat-sealed to each other at the innermost layer and used as a packaging bag.

ADVANTAGEOUS EFFECTS OF INVENTION

The medical packaging film of the present invention contains a laminate of thermoplastic resin formation layers and can package a medicine or a powder as a drug substance thereof without electrically charging.

According to the medical packaging film of the present invention, the second layer in contact, with the first layer as an innermost layer in contact with the contents to be packaged, and as necessary, the (n−1)th layer in contact with the (n)th layer as an outermost layer at the external side, are the thermoplastic resin formation layers that form antistatic layers and contain a polymer antistatic agent that is a potassium ionomer. As a result, the antistatic performance of the surface layer can be maintained.

The medical packaging film of the present, invention can exhibit a sufficient antistatic performance even with a small content of the potassium ionomer, by adjusting layer constitutions including the thickness and resin component of each thermoplastic resin formation layer and the content of the potassium ionomer as a polymer antistatic agent. The medical packaging film of the present, invention also shows a small acid titer in an alkali test by decreasing the elutable alkali component, and shows a small ignition residue.

As a result, the medical packaging film of the present invention does not contaminate the contents when filling, storing and then transporting a medicine or a content powder as a drug substance thereof.

The medical packaging film of the present invention has a high safety when it conforms to regulations of a country-specific pharmacopeia such as European Pharmacopeia, US Pharmacopeia or Japanese Pharmacopeia, for example, various regulations of test method for plastic medical container and the like.

Furthermore, the medical packaging film of the present invention can sufficiently exhibit an antistatic performance even in the case where the thickness of the thermoplastic resin formation layer containing a polymer antistatic agent, particularly, a potassium ionomer, is decreased to about 4 μm. In such a case, even when large weights are packaged and lifted when transporting, the package does not break and is tough. Therefore, a high reliability is achieved.

BRIEF DESCRIPTION OF DRAWINGS

FIG. 1 is a schematic cross-sectional view of a medical packaging film formed of from three to five layers in which only the second layer contains a potassium ionomer, to which the present invention is applied.

FIG. 2 is a schematic cross-sectional view of a medical packaging film formed of at least five layers in which the second layer and the (n−1)th layer contain a potassium ionomer, to which the present invention is applied.

FIG. 3 is a graph showing the correlation between a thickness $L_1$ μm of the first layer and the product of a thickness $L_2$ μm of the second layer and $C'_2$ vol % of a potassium ionomer concentration, in the medical packaging film to which the present invention is applied and in a film to which the present invention is not applied.

FIG. 4 is a graph showing the correlation between a ratio (potassium ionomer layer ratio) of a thickness of a potassium ionomer layer as the second layer or the (n−1)th layer to a thickness of all layers of the medical packaging film to which the present invention is applied and an potassium ionomer concentration (vol %) of the potassium ionomer layer.

FIG. 5 is a graph showing the correlation between a ratio (outer layer ratio) of the total thickness of the third layer and the non-potassium ionomer layers as the subsequent outer layers in the case where the film is formed of five or less layers and only the second layer contains a potassium ionomer or a ratio (intermediate layer ratio) of the total thickness of the non-potassium ionomer layers present between the second layer and the (n−1)th layer in the case where the film is formed of at least five layers, to a thickness of all layers of the medical packaging film to which the present invention is applied, and a potassium ionomer concentration (vol %) of the second layer or the potassium ionomer layer as the (n−1)th layer.

DESCRIPTION OF EMBODIMENTS

The embodiments for carrying out the present invention are described in detailed below, but the scope of the present invention is not limited to those embodiments.

The medical packaging film of the present invention is to package a pharmaceutical such as a medicine and a drug substance thereof as the contents and formed of a laminate containing at least three thermoplastic resin formation layers. One embodiment is described below by reference to FIG. 1.

The medical packaging film illustrated in FIG. 1 is a laminate of from three to five thermoplastic resin formation layers. An example formed of three layers is described below. In the laminate, the first layer that is an innermost layer in contact with a pharmaceutical is a thermoplastic resin formation layer containing no antistatic agent, the second layer in contact with the first layer at the external side is a thermoplastic resin formation layer containing a polymer antistatic agent that is a potassium ionomer (hereinafter also referred to as a "potassium ionomer-containing thermoplastic resin formation layer), and a third layer that is an outermost layer in contact with the second layer at the external side is a thermoplastic resin formation layer. The third layer is preferably a thermoplastic resin formation layer containing no antistatic agent.

In the second layer of the medical packaging film of the present invention is used a potassium ionomer, which is a polymer antistatic agent that is not a surfactant being affected by humidity in an antistatic effect, is difficult to be eluted even though contained in a thermoplastic resin, is difficult to be affected by humidity, and can sustain the effect, semi-permanently.

Regarding the use for a medicine, the potassium ionomer that is admitted to use in food packaging and has a high safety is used as the polymer antistatic agent. As the potassium ionomer, for example, ENTIRA (registered trademark) AS Series, which are polymer antistatic agents manufactured by DUPONT-MITSUI, conform to U.S. Food and Drug Administration (FDA) Paragraph 177. 1330 and are registered in positive list of Japan Hygienic Olefin And Styrene Plastics Association, and therefore have high hygiene, safety and reliability.

In the medical packaging film, the potassium ionomer-containing thermoplastic resin formation layer is prepared by blending a thermoplastic resin and a potassium ionomer. The potassium ionomer-containing thermoplastic resin formation layer contains the potassium ionomer in an amount of C wt % (10<C<30) in a single layer.

In the case where the content of the potassium ionomer in the potassium ionomer-containing thermoplastic resin formation layer is less than the above range, the antistatic performance becomes insufficient. On the other hand, in the case where the content, of the potassium ionomer is more than the above range, the content of an alkali component elutable in water or in pharmaceuticals as contents or the ignition residue increases, and due to those components contained, incorporation in pharmaceuticals increases, leading to deterioration of quality of pharmaceuticals.

Examples of the potassium ionomer include a potassium ionomer of an ethylene-unsaturated carboxylic acid copolymer in which ethylene is copolymerized with an unsaturated carboxylic acid. Examples of the unsaturated carboxylic acid include acrylic acid, methacrylic acid, fumaric acid, maleic anhydride, monomethyl maleate, and monoethyl maleate. Acrylic acid or methacrylic acid is particularly preferred. Another polar monomer may be contained as a copolymer component.

Another ionomer, a polyether-polyolefin copolymer and/or a polyether amide-polyolefin copolymer may be contained as the polymer antistatic agent, in addition to the potassium ionomer.

The potassium ionomer has an unsaturated carboxylic acid content of generally from 10 to 30 wt % and preferably from 10 to 25 wt. %, and has a degree of neutralization by potassium ions of the ethylene-unsaturated carboxylic acid copolymer being generally 60% or more and preferably 70% or more. In the case where a potassium ionomer having an excessively small unsaturated carboxylic acid content or excessively low degree of neutralization is used, sufficient antistatic effect cannot be imparted.

As the thermoplastic resin, various polyolefins can be used. Examples of the thermoplastic resin include polyethylene (e.g., low density polyethylene, linear low density polyethylene, high density polyethylene, and cyclic polyethylene), polypropylene, ethylene-vinyl acetate copolymers, ethylene-vinyl alcohol copolymers, copolymers of ethylene and an unsaturated carboxylic acid (e.g., acrylic acid, methacrylic acid, maleic acid, etc.), copolymers of ethylene and an unsaturated carboxylic acid ester (e.g., methyl acrylate, methyl methacrylate, methyl maleate, dimethyl maleate, etc.), polyesters such as polyethylene terephthalate, and polyamides. Of those, use of a polyethylene resin is particularly preferable because of its excellent bag making processability.

In the case where a cyclopolyolefin, an ethylene-vinyl alcohol copolymer (EVOH) or an ethylene-vinyl acetate copolymer (EVA) is used as another thermoplastic resin, barrier function can be imparted.

Furthermore, in the case where a polyamide or polyester is used as another thermoplastic resin, the strength of the medical packaging film can be enhanced.

Those thermoplastic resins may be used alone and may be used as a blend of those resins.

In some cases, the medical packaging film is required to conform to a country-specific Pharmacopeia according to the case of being used as a medical packaging film. For example, in European Pharmacopeia (European Pharmacopeia 8.0), a material of polyolefin is restricted, and acid/alkali amount and ignition residue are limited.

The test of acid/alkali amount in the European Pharmacopeia uses a piece obtained by cutting a film into 1 cm square. Therefore, the acid/alkali amount is a value influenced by elution not only from the surface of the film but also from the cut surface. For this reason, in order to suppress the acid/alkali amount, not only a potassium ionomer-added layer is not provided on a surface layer, but also the amount of the potassium ionomer added must be thought out.

Since the first layer has a thickness of $L_1$ µm, the second layer has a potassium ionomer concentration of $C'_2$ vol %, the second layer has a thickness of $L_2$ µm, and they satisfy the following formula (1), the medical packaging film can exhibit a sufficient antistatic performance even with a small content of the potassium ionomer, can show a small acid titer in an alkali test by decreasing the elutable alkali component and can show a small ignition residue.

$$2 \leq L_1 \leq (5 \times L_2 \times C'_2)/100 + 5 \quad (1)$$

The medical packaging film of one embodiment is a laminate of from three to five thermoplastic resin formation layers as illustrated in FIG. 1, and only the second layer contains the potassium ionomer.

In the present embodiment, in the case where the first layer has the thickness of $L_1$ µm; the second layer contains a base resin having a density of $D_{2b}$ g/cm$^3$ and the potassium ionomer having a density of $D_2$ g/cm$^3$ and having concentrations of $C_2$ wt % and $C'_2$ vol %; the second layer has the thickness of $L_2$ µm; and they satisfy the above formula (1) and the following formula (2), the medical packaging film can improve the antistatic effect of the first layer with a small content of the potassium ionomer in the second layer, which is thus preferred.

$$C'_2/100 = (C_2/D_2)/[(100-C_2)/D_{2b} + C_2/D_2] \quad (2)$$

In the medical packaging film of the present embodiment, when a potassium ionomer-containing layer serving as an antistatic layer is provided at the surface layer side, the alkali amount is increased. For this reason, the first layer provided at the surface layer side than the second layer that is the potassium ionomer-containing thermoplastic resin formation layer and the outermost layer are formed of a no-potassium ionomer-containing thermoplastic resin formation layer. The thickness of the first layer and outermost layer depends on the amount of the potassium ionomer added in the second layer.

In the medical packaging film, in order to exhibit an antistatic effect with a small content of the potassium ionomer content, the thicknesses of the first layer and second layer are preferably thinner than at least one of the thickness of any one of the other layers and the total thickness of the other layers.

In the present embodiment, it is preferable that the thickness of the first layer is generally from 2 to 30 µm and preferably from 5 to 15 µm, the thickness of the second layer is generally from 2 to 100 µm and preferably from 5 to 30 µm, and the thickness of each layer of the third layer and the subsequent outer layers is generally from 10 to 300 µm and preferably from 50 to 100 µm.

Specific examples of the medical packaging film of the present embodiment include one in which the materials of first layer/second layer/third layer are low density polyethylene (LDPE)/blend of 80 wt % LDPE and 20 wt % potassium ionomer/LDPE and their thicknesses tire 10 µm/10 µm/80 µm.

In the case where the thicknesses of the first layer and second layer are thinner than the thickness of the third layer and the subsequent outer layers as such, the medical packaging film can exhibit an antistatic effect with a small content of the potassium ionomer, which is thus preferred.

In the case of containing the fourth layer and fifth layer formed of no-antistatic agent-containing thermoplastic resin formation layers as the outermost layers as illustrated in FIG. 1, the thicknesses of the first layer and second layer are more preferably thinner than the thickness of the third layer, the thicknesses of the fourth layer and fifth layer having a Similar composition to the third layer and having the same or different thickness, and the total thickness of those.

The medical packaging film of another embodiment is a laminate of at least five thermoplastic resin formation layers as illustrated in FIG. 2, and the second layer and the (n–1)th layer in contact with the inside of the (n)th layer that is the outermost layer contain the potassium ionomer each in an amount of C wt % (10<C<30) in a single layer.

In the case where the second layer and the (n–1)th layer are the thermoplastic resin formation layer containing the polymer antistatic agent such as the potassium ionomer as such, not only the antistatic effect can be imparted to the surface layer of the innermost layer, but also the antistatic effect can be imparted to the outermost layer at the external side, and the environmental dust is suppressed from attaching to the inside of a bag and the outside of the bag.

In this embodiment, in the case where the first layer has the thickness of $L_1$ µm; the second layer contains a base resin having a density of $D_{2b}$ g/cm$^3$ and the potassium ionomer having a density of $D_2$ g/cm$^3$ and having concentrations of $C_2$ wt % and $C'_2$ vol %; the second layer has the thickness of $L_2$ µm; and they satisfy the above formula (1) and the following formula (2), and the (n)th layer has a thickness of $L_n$ µm; the (n–1)th layer contains a base resin having a density of $D_{(n-1)b}$ g/cm$^3$ and the potassium ionomer having a density of $D_{n-1}$ g/cm$^3$ and having concentrations $C_{n-1}$ wt % and $C'_{n-1}$ vol %; the (n–1)th layer has a thickness of $L_{n-1}$ µm; and they satisfy the following formulae (3) and (4), the medical packaging film can improve the antistatic effect on both surfaces of the film with small concentrations of the potassium ionomer in the respective second layer and (n–1)th layer, which is thus preferred.

$$C'_2/100 = (C_2/D_2)/[(100-C_2)/D_{2b} + C_2/D_2] \quad (2)$$

$$2 \leq L_1 \leq (5 \times L_2 \times C'_2)/100 + 5 \quad (3)$$

$$C'_{n-1}/100 = (C_{n-1}/D_{n-1})/[(100-C_{n-1})/D_{m-1,b} + C_{n-1}/D_{n-1}] \quad (4)$$

The medial packaging film illustrated in FIG. 2 is not limited in the number n of the (n)th layer so long as the thermoplastic resin formation layers are five or more layers, but preferably contains from five to seven layers.

In this case, regarding the thickness of the first layer and second layer, it is preferable that the thickness of the first layer is generally from 2 to 30 µm and preferably from 5 to 15 µm and the thickness of the second layer is generally from 2 to 100 µm and preferably from 5 to 30 µm. It is preferable that each thickness of the third layer to the (n−2)th layer that are the thermoplastic resin formation layers containing no antistatic agent at the external side is generally from 10 to 300 μm and preferably from 50 to 100 μm.

At least one of each thickness of the third layer to the (n−2)th layer and the total thickness of those layers is preferably set thicker than the thickness of the first layer or the second layer and the thickness of the (n−1)th layer or the (n)th layer. On the other hand, the (n)th layer that is the outmost layer and the (n−1)th layer in contact therewith preferably have the thicknesses shown in the first layer and the second layer, respectively. The thickness of the (n)th layer that is the outermost layer is the same as or different from the thickness of the first layer. The (n)th layer containing no potassium ionomer and the (n−1)th layer containing the potassium ionomer preferably have the thicknesses and the ratio thereof as exemplified in the first layer and second layer.

Other constituents of the medical packaging film illustrated in FIG. 2 are the same as illustrated in FIG. 1.

The medical packaging film has a water-elutable alkali component of at most 0.01 mmol equivalent, that is, 0.01 mmol equivalent or less, per 5 g in total of 1 cm$^2$ pieces. The amount of the elutable alkali component can be measured by an alkali test described hereinafter in Examples according to European Pharmacopeia.

The medical packaging film preferably shows an ignition residue of at most 1%, that is, 1% or less. The ignition residue can be measured by an ignition residue test described hereinafter in Examples according to European Pharmacopeia.

The medical packaging film is required to have, for example, the innermost layer having a surface resistivity of less than $10^{14}\Omega$, in order to prevent that a medicine or a drug substance thereof adsorbs on or adheres to the innermost layer of the medical packaging film by static electricity and is not taken out of the film and in order to prevent dust explosion. The surface resistivity can be measured by a surface resistivity measurement test described hereinafter in Examples.

The medical packaging film preferably has the innermost layer having, for example, an electrostatic potential of 1.0 kV or less and a half-life thereof of 60 seconds or less, in order to prevent that a medicine or drug substance thereof adsorbs on or adheres to the innermost layer of the medical packaging film by static electricity and is not taken out of the film and in order to prevent dust explosion. The electrostatic potential and half-life thereof of the innermost layer can be measured by electrostatic potential measurement and half-life measurement tests described hereinafter in Examples.

In the case where the medical packaging film is heat-sealed at the innermost layer to each other to form into a bag-shape, considering durability in packaging and transporting large weights, for example, about 20 kg of a medicine or a drug substance thereof, a heat-sealing strength of preferably 10 N/15 mm or more is value capable of sufficiently packaging the contents in heat-sealing the lower part of a cylindrical film having a width of 800 mm. The heat-sealing strength can be measured by a seal strength test described hereinafter in Examples.

In the case where the potassium ionomer-added layer is provided as the surface layer, interfacial peeling is liable to occur. Considering this, in the case where the medical packaging film is heat-sealed at the innermost layer to each other to form into a bag-shape, interfacial peeling with the lapse of time, and the like cannot be measured by the breaking strength of the heat-sealed part. Therefore, the medical packaging film preferably has a peeling strength such that even after the measurement method in which the innermost layers of the laminates are heat-sealed to each other with a width of 15 mm to prepare a test piece and a load of 1 kg is attached to one side of the test piece, followed by allowing to stand for 48 hours, the test piece of the laminates does not peel apart.

The medical packaging film can be formed by various melt extrusion molding machines such as a multilayer inflation film-forming machine and a multilayer cast film forming machine.

The medical packaging film may have a sheet shape for packaging a medicine so as to wrap it, and may have a bag shape having one open edge so as to charge and package a medicine therein. The medical packaging film is preferably that the laminate is a packaging sheet or one or two laminates are heat-sealed at the innermost layer to each other while opening one side and used as a packaging bag.

Specifically, for example, in the case of a packaging sheet, the packaging sheet is folded so as to wrap a medicine or a drug substance thereof to package it. Furthermore, for example, in the case of a packaging bag, a medicine or a drug substance thereof is charged in the bag from an open edge, and as necessary, the open edge is sealed or heat-sealed to encapsulate and package it.

EXAMPLES

Examples in which the medical packaging films of the present invention were prepared, Comparative Examples in which films to which the present invention was not applied were prepared, and the results of performance tests of those films are described below.

Examples 1 to 26

Medical packaging films were obtained by melting each thermoplastic resin layer individually and performing an extrusion-molding by using a multilayer inflation film forming machine, in resin constitutions constituted as shown in Table 2 corresponding to FIG. 1 or in resin constitutions constituted as shown in Table 3 corresponding to FIG. 2.

Comparative Examples 1 and 3 to 10

Films to which the present invention was not applied were obtained in the same manners as in Examples 1 to 26, except for changing the resin constitutions to that respectively shown in Table 4.

Comparative Example 2

Film to which the present invention was not applied was obtained in the same manners as in Examples 1 to 26, except for using a single layer inflation forming machine and changing the resin constitution to that shown in Table 4.

The thermoplastic resins and antistatic agents used in Examples 1 to 26 and Comparative Examples 1 to 10 are shown in Table 1 below.

TABLE 1

| Abbreviation | Polymer material | Manufacturer | Grade | Density (g/cm$^3$) | MFR (g/10 min, 190° C.) |
|---|---|---|---|---|---|
| PE1 | LDPE (Low density Polyethylene) | Sumitomo Chemical | Sumikathene F200-0 | 0.924 | 2.0 |
| PE2 | Metallocene LLDPE (Linear low density Polyethylene) | Prime Polymer | Evolue SP1520 | 0.913 | 2.0 |
| PE3 | LDPE (Low density Polyethylene) | Sumitomo Chemical | Sumikathene L-718H | 0.921 | 8.0 |
| HDPE | HDPE (High densityPolyethylene) | Nippon Polyethylene | Novatec HB530R | 0.960 | 0.7 |
| Modified PE | Acid-modified PE (Acid-modified Polyethylene) | Mitsui Chemical | Admer NF558 | 0.913 | 4.2 |
| COP | Cycloolefin polymer | Zeon Corporation | Zeonor 1020R | 1.01 | 20 (280° C.) |
| EVOH | Ethylene-vinyl alcohol copolymer | The Nippon Synthetic Chemical | Soarnol AT4403B | 1.14 | 3.5 (210° C.) |
| PA | Polyamide | Arkema | RILSAN BESV O A MED | 1.02 | 1.3 (210° C.) |
| PP | Block PP (Block polyprolylene) | SunAllomer | Sunallomer PC480A | 0.900 | 2.0 |
| MK400 | Ethylene-methacrylic acid copolymer potassium ionomer | Du Pont-Mitsui Polychemicals | Entira MK400 | 0.965 | 1.0 |
| SD100 | Ethylene-methacrylic acid copolymer potassium ionomer | Du Pont-Mitsui Polychemicals | Entira SD100 | 0.985 | 5.0 |
| A52 | Surfactant antistatic agent | Sumitomo Chemical | Sumikathene A52 | 1.00 | 5.0 |

TABLE 2

| | Total thickness (μm) | First layer Composition | Thickness (μm) | Second layer Composition (wt ratio) | Thickness (μm) | Thrid layer Composition | Thickness (μm) | Fourth layer Composition | Thickness (μm) | Fifth layer Composition | Thickness (μm) |
|---|---|---|---|---|---|---|---|---|---|---|---|
| Ex. 1 | 100 | PE1 | 10 | PE1 (80) MK400 (20) | 10 | PE1 | 80 | — | — | — | — |
| Ex. 2 | 120 | PE1 | 12 | PE1 (80) MK400 (20) | 12 | PE1 | 96 | — | — | — | — |
| Ex. 3 | 40 | PE1 | 4 | PE1 (80) MK400 (20) | 4 | PE1 | 32 | — | — | — | — |
| Ex. 4 | 100 | PE1 | 10 | PE1 (80) SD100 (20) | 10 | PE1 | 80 | — | — | — | — |
| Ex. 5 | 100 | PE2 | 10 | PE2 (88) MK400 (12) | 35 | PE2 | 55 | — | — | — | — |
| Ex. 6 | 100 | PE2 | 10 | PE2 (85) MK400 (15) | 30 | PE2 | 60 | — | — | — | — |
| Ex. 7 | 100 | PE2 | 10 | PE2 (80) MK400 (20) | 20 | PE2 | 70 | — | — | — | — |
| Ex. 8 | 100 | PE2 | 10 | PE2 (85) MK400 (15) | 10 | PE2 | 80 | — | — | — | — |
| Ex. 9 | 100 | PE2 | 10 | PE2 (75) MK400 (25) | 10 | PE2 | 80 | — | — | — | — |
| Ex. 10 | 100 | PE2 | 10 | PE2 (72) MK400 (28) | 5 | PE2 | 85 | — | — | — | — |
| Ex. 11 | 100 | PE2 | 12 | PE3 (80) MK400 (20) | 8 | PE2 | 80 | — | — | — | — |
| Ex. 12 | 100 | PE2 | 8 | PE2 (85) MK400 (15) | 5 | PE2 | 87 | — | — | — | — |
| Ex. 13 | 100 | PE2 | 8 | PE2 (80) MK400 (20) | 8 | PE2 | 84 | — | — | — | — |
| Ex. 14 | 100 | PE2 | 5 | PE2 (80) MK400 (20) | 5 | PE2 | 90 | — | — | — | — |
| Ex. 15 | 60 | PE2 | 10 | PE2 (80) MK400 (20) | 10 | PE2 | 40 | — | — | — | — |
| Ex. 16 | 100 | PE3 | 10 | PE3 (80) MK400 (20) | 10 | PE3 | 80 | — | — | — | — |
| Ex. 17 | 100 | HDPE | 10 | HDPE (80) MK400 (20) | 10 | HDPE | 80 | — | — | — | — |
| Ex. 18 | 100 | PA | 10 | PA (80) MK400 (20) | 10 | PA | 80 | — | — | — | — |
| Ex. 19 | 100 | PP | 10 | PP (80) MK400 (20) | 10 | PP | 80 | — | — | — | — |
| Ex. 20 | 100 | COP | 10 | COP (80) MK400 (20) | 10 | COP | 80 | — | — | — | — |
| Ex. 21 | 100 | PE1 | 10 | PE1 (80) MK400 (20) | 10 | PE1 | 70 | PA | 10 | — | — |

TABLE 2-continued

| | Total thickness (μm) | First layer Composition | Thickness (μm) | Second layer Composition (wt ratio) | Thickness (μm) | Thrid layer Composition | Thickness (μm) | Fourth layer Composition | Thickness (μm) | Fifth layer Composition | Thickness (μm) |
|---|---|---|---|---|---|---|---|---|---|---|---|
| Ex. 22 | 100 | PE1 | 10 | PE1 (80) MK400 (20) | 10 | PE1 | 60 | Modified PF | 10 | PA | 10 |

TABLE 3

| | Total thickness (μm) | First layer Composition | Thickness (μm) | Second layer Composition (wt ratio) | Thickness (μm) | Thrid layer Composition | Thickness (μm) | Fourth layer Composition | Thickness (μm) |
|---|---|---|---|---|---|---|---|---|---|
| Ex. 23 | 100 | PE1 | 5 | PE1 (80) MK400 (20) | 5 | PE1 | 80 | — | — |
| Ex. 24 | 100 | PE1 | 5 | PE1 (80) MK400 (20) | 5 | PE1 | 80 | — | — |
| Ex. 25 | 100 | PE1 | 5 | PE1 (80) MK400 (20) | 5 | Modified PE | 35 | EVOH | 10 |
| Ex. 26 | 100 | PE1 | 5 | PE1 (80) MK400 (20) | 5 | PE1 | 35 | COP | 10 |

| | (n-2)th layer Composition | Thickness (μm) | (n-1)th layer Composition (wt ratio) | Thickness (μm) | (n)th layer Composition | Thickness (μm) |
|---|---|---|---|---|---|---|
| Ex. 23 | — | — | PE1 (80) MK400 (20) | 5 | PE1 | 5 |
| Ex. 24 | — | — | Modified PE (80) MK400 (20) | 5 | PA | 5 |
| Ex. 25 | Modified PE | 35 | PE1 (80) MK400 (20) | 5 | PE1 | 5 |
| Ex. 26 | PE1 | 35 | PE1 (80) MK400 (20) | 5 | PE1 | 5 |

TABLE 4

| | Total thickness (μm) | First layer Composition | Thickness (μm) | Second layer Composition (wt ratio) | Thickness (μm) | Thrid layer Composition | Thickness (μm) | Fourth layer Composition | Thickness (μm) |
|---|---|---|---|---|---|---|---|---|---|
| Comp. Ex. 1 | 100 | PE1 | 10 | PE1 (97) A52 (3) | 10 | PE1 | 80 | — | — |
| Comp. Ex. 2 | 100 | PE1 (80) MK400 (20) | 100 | — | — | — | — | — | — |
| Comp. Ex. 3 | 100 | PE1 (80) MK400 (20) | 10 | PE1 | 80 | PE1 (80) MK400 (20) | 10 | — | — |
| Comp. Ex. 4 | 100 | PE1 (88) MK400 (12) | 10 | PE1 | 90 | — | — | — | — |
| Comp. Ex. 5 | 100 | PE2 | 10 | PE2 (85) MK400 (15) | 50 | PE2 | 40 | — | — |
| Comp. Ex. 6 | 100 | PE2 | 10 | PE2 (80) MK400 (20) | 30 | PE2 | 60 | — | — |
| Comp. Ex. 7 | 100 | PE2 | 10 | PE2 (90) MK400 (10) | 10 | PE2 | 80 | — | — |
| Comp. Ex. 8 | 100 | PE2 | 10 | PE2 (70) MK400 (30) | 10 | PE2 | 80 | — | — |
| Comp. Ex. 9 | 100 | PE2 | 15 | PE2 (80) MK400 (20) | 10 | PE2 | 75 | — | — |

TABLE 4-continued

| | | | | | | | | | |
|---|---|---|---|---|---|---|---|---|---|
| Comp. Ex. 10 | 100 | PE2 | 10 | PE2 (80) MK400 (20) | 10 | PE2 | 20 | — | — |

| | (n-2)th layer | | (n-1)th layer | | (n)th layer | |
|---|---|---|---|---|---|---|
| | Composition | Thickness (μm) | Composition (wt ratio) | Thickness (μm) | Composition | Thickness (μm) |
| Comp. Ex. 1 | — | — | — | — | — | — |
| Comp. Ex. 2 | — | — | — | — | — | — |
| Comp. Ex. 3 | — | — | — | — | — | — |
| Comp. Ex. 4 | — | — | — | — | — | — |
| Comp. Ex. 5 | — | — | — | — | — | — |
| Comp. Ex. 6 | — | — | — | — | — | — |
| Comp. Ex. 7 | — | — | — | — | — | — |
| Comp. Ex. 8 | — | — | — | — | — | — |
| Comp. Ex. 9 | — | — | — | — | — | — |
| Comp. Ex. 10 | — | — | — | — | — | — |

The medical packaging films containing the laminates obtained in Examples 1 to 26 to which the present invention was applied and the medical packaging films containing the laminates obtained in Comparative Examples 1 to 10 to which the present invention was not applied were subjected to the following evaluation tests.

Test Method 1: Alkali Test

The alkali test is for the index of the prevention of denaturation of a medicine as the contents in conformity with European standard, and was conducted according to European Pharmacopeia. The laminates of the medical packaging films of Examples 1 to 26 and Comparative Examples 1 to 10 were cut into film pieces of 1 cm² square or less, which were used as sample. The sample (2.5 g) was weighed and placed in a 1-L separable flask, and thereto was added 500 ml of water. A reflux condenser was attached to the flask and the mixture was extracted under reflux at 100° C. for 5 hours.

After cooling, the sample was removed with a glass filter (P16) to obtain a test solution S1. Then, 100 mL of S1 was weighed and placed in a 200-mL Erlenmeyer flask. Thereto was added 0.2 mL of methyl orange and the resulting solution was titrated with a 0.01N hydrochloric acid solution until changing to orange color. The case where the acid titer was 1.0 mL or less was judged to be acceptable, and the case of exceeding 1.0 mL was judged to be unacceptable.

Test Method 2: Ignition Residue Test

The ignition residue test is to measure the residual amount of components non-volatile even by ignition, mainly such as alkali metals, is for the index of the prevention of denaturation of a medicine as the contents, and was conducted according to European Pharmacopeia.

The laminates of the medical packaging films of Examples 1 to 26 and Comparative Examples 1 to 10 were cut into film pieces of about 5 mm square, which were used as the sample. The sample (5 g) was weighed and placed in a platinum crucible, which had reached a constant weight in advance, and thereto was added 1 mL of sulfuric acid. The crucible was heated in an electric furnace (Part No.: KBF848N, manufactured by Koyo Thermo Systems Co., Ltd.) at 600° C. and strongly heated until completely carbonizing. After naturally cooling, the mass was weight and residue concentration was calculated.

The test results of the test methods 1 and 2 are shown in Table 5 and Table 6.

TABLE 5

| | Total thickness (μm) | Second layer Composition (wt ratio) | Thickness (μm) | (n-1)th layer Composition (wt ratio) | Thickness (μm) | European Pharmacopeia Alkali test (mL) | Ignition residue (%) |
|---|---|---|---|---|---|---|---|
| Ex. 1 | 100 | PE1 (80) MK400 (20) | 10 | — | — | 0.6 | 0.6 |
| Ex. 2 | 120 | PE1 (80) MK400 (20) | 12 | — | — | 0.6 | 0.2 |
| Ex. 3 | 40 | PE1 (80) MK400 (20) | 4 | — | — | 0.6 | 0.2 |
| Ex. 4 | 100 | PE1 (80) SD100 (20) | 10 | — | — | 0.6 | 0.2 |

TABLE 5-continued

| | Total thickness (μm) | Second layer Composition (wt ratio) | Thickness (μm) | (n-1)th layer Composition (wt ratio) | Thickness (μm) | Alkali test (mL) | European Pharmacopeia Ignition residue (%) |
|---|---|---|---|---|---|---|---|
| Ex. 5 | 100 | PE2 (88) MK400 (12) | 35 | — | — | 0.9 | 0.4 |
| Ex. 6 | 100 | PE2 (85) MK400 (15) | 30 | — | — | 0.9 | 0.5 |
| Ex. 7 | 100 | PE2 (80) MK400 (20) | 20 | — | — | 1.0 | 0.4 |
| Ex. 8 | 100 | PE2 (85) MK400 (15) | 10 | — | — | 0.5 | 0.2 |
| Ex. 9 | 100 | PE2 (75) MK400 (25) | 10 | — | — | 1.0 | 0.3 |
| Ex. 10 | 100 | PE2 (72) MK400 (28) | 5 | — | — | 0.9 | 0.1 |
| Ex. 11 | 100 | PE2 (80) MK400 (20) | 8 | — | — | 0.5 | 0.2 |
| Ex. 12 | 100 | PE2 (85) MK400 (15) | 5 | — | — | 0.4 | 0.1 |
| Ex. 13 | 100 | PE2 (80) MK400 (20) | 8 | — | — | 0.5 | 0.2 |
| Ex. 14 | 100 | PE2 (80) MK400 (20) | 5 | — | — | 0.4 | 0.1 |
| Ex. 15 | 60 | PE2 (80) MK400 (20) | 10 | — | — | 0.9 | 0.3 |
| Ex. 16 | 100 | PE3 (80) MK400 (20) | 10 | — | — | 0.6 | 0.2 |
| Ex. 17 | 100 | HDPE (80) MK400 (20) | 10 | — | — | 0.6 | 0.2 |
| Ex. 18 | 100 | PA (80) MK400 (20) | 10 | — | — | 0.6 | 0.2 |
| Ex. 19 | 100 | PP (80) MK400 (20) | 10 | — | — | 0.6 | 0.2 |
| Ex. 20 | 100 | COP (80) MK400 (20) | 10 | — | — | 0.6 | 0.2 |
| Ex. 21 | 100 | PE1 (80) MK400 (20) | 10 | — | — | 0.6 | 0.2 |
| Ex. 22 | 100 | PE1 (80) MK400 (20) | 10 | — | — | 0.6 | 0.2 |
| Ex. 23 | 100 | PE1 (80) MK400 (20) | 5 | PE1 (80) MK400 (20) | 5 | 0.6 | 0.2 |
| Ex. 24 | 100 | PE1 (80) MK400 (20) | 5 | Modified PE (80) MK400 (20) | 5 | 0.7 | 0.2 |
| Ex. 25 | 100 | PE1 (80) MK400 (20) | 5 | PE1 (80) MK400 (20) | 5 | 1.0 | 0.2 |
| Ex. 26 | 100 | PE1 (80) MK400 (20) | 5 | PE1 (80) MK400 (20) | 5 | 0.6 | 0.2 |

TABLE 6

| | Total thickness (μm) | Second layer Composition (wt ratio) | Thickness (μm) | (n − 1)th layer Composition (wt ratio) | Thickness (μm) | Alkali test (mL) | European Pharmacopeia Ignition Residue (%) |
|---|---|---|---|---|---|---|---|
| Comp. Ex. 1 | 100 | PE1 (97) A52 (3) | 10 | — | — | 0.4 | 0.1 |
| Comp. Ex. 2 | 100 | — | — | — | — | 10 | 2.0 |
| Comp. Ex. 3 | 100 | PE1 | 80 | — | — | 5.0 | 0.4 |
| Comp. Ex. 4 | 100 | PE1 | 90 | — | — | 2.0 | 0.1 |

TABLE 6-continued

| | Total thickness (μm) | Second layer Composition (wt ratio) | Thickness (μm) | (n − 1)th layer Composition (wt ratio) | Thickness (μm) | European Pharmacopeia Alkali test (mL) | Ignition Residue (%) |
|---|---|---|---|---|---|---|---|
| Comp. Ex. 5 | 100 | PE2 (85) MK400 (15) | 50 | — | — | 1.6 | 0.8 |
| Comp. Ex. 6 | 100 | PE2 (80) MK400 (20) | 30 | — | — | 1.5 | 0.6 |
| Comp. Ex. 7 | 100 | PE2 (90) MK400 (10) | 10 | — | — | 0.4 | 0.1 |
| Comp. Ex. 8 | 100 | PE2 (70) MK400 (30) | 10 | — | — | 1.5 | 0.3 |
| Comp. Ex. 9 | 100 | PE2 (80) MK400 (20) | 10 | — | — | 0.6 | 0.2 |
| Comp. Ex. 10 | 40 | PE2 (80) MK400 (20) | 10 | — | — | 1.3 | 0.5 |

As shown in Table 5 and Table 6, regarding the medical packaging films of Examples 1 to 26 to which the present invention was applied, it was understood that according to the alkali test, the acid titer was small as 1 ml at the maximum value and therefore the amount of the elutable alkali component was small; and that according to the ignition test, the ignition residue was only 0.6% at the maximum value and the ignition residue was small.

On the other hand, among the films of Comparative Examples 1 to 10 to which the present invention was not applied, according to the alkali test, there were many films requiring the acid titer exceeding 1 mL, and even though the acid titer was less than 1 mL, sufficient antistatic effect was not achieved in Comparative Examples 1, 7 and 9.

Test Method 3; Surface Resistivity Measurement Test

The surface resistivity measurement test is for the indexes of the prevention of adhesion of powder contents to the medical packaging film and the prevention of dust explosion. Each film of Examples 1 to 26 and Comparative Examples 1 to 10 was allowed to stand in the standard atmosphere (23° C. and 50% RH) for 24 hours according to JIS K7100 (1999). Thereafter, surface resistance at the first layer side of each film when charged at 100V for 1 minute was measured by using a digital ultra-high resistance/micro current meter [Part No.: 8340A, manufactured by ADC Corporation] according to JIS K6911 (2006) (inner diameter of guard electrode: 70 mm, diameter of main electrode: 50 mm). The surface resistivity was calculated by the following formula (5).

$$\rho s = \{\pi(D+d)/(D-d)\} \times Rs \quad (5)$$

In the formula (5), ρs: surface resistivity (Ω), Rs: surface resistance (Ω), D: inner diameter of guard electrode (cm), d: diameter of main electrode, and π: the circular constant.

Test Method 4: Electrostatic Potential Measurement/Half-Life Measurement Test

The electrostatic potential measurement/half-life measurement test is for the indexes of the prevention of adhesion of powder contents to the medical packaging film and the prevention of dust explosion. Each film of Examples 1 to 26 and Comparative Examples 1 to 10 was allowed to stand in the standard atmosphere (23° C. and 50% RH) for 24 hours according to JIS K7100 (1999). Thereafter, voltage of 10 kY was applied to the first layer side of each film until electrostatic potential became stable while rotating a turntable of the measuring equipment, and the electrostatic potential was measured by using STATIC HONESTMETER (Part No: H-0110, manufactured by Shishido Electrostatic, Ltd.) according to JIS L1094 (2014) (applied voltage: 10 kV, distance from electrode of application part to test piece: 20 mm, and distance from electrode of power receiving part to test piece: 15 mm). Thereafter, the application was stopped and the time (second) until the electrostatic potential was attenuated to ½ of the initial electrostatic potential was measured as half-life while continuously rotating the turntable.

Test Method 5: Seal Strength Test

The seal strength test is for the index of the prevention of bag breakage when the medical packaging film is formed into a bag and filled with the contents. Each film of Examples 1 to 26 and Comparative Examples 1 to 10 was sealed so that the first layer faced inside by using a heat seal tester (Part No.: TP-701-B, manufactured by Tester Sangyo Co., Ltd.) (seal pressure: 0.2 MPa, seal time: 1 second, and seal width: 1 cm)

The seal temperature was set 180° C. in the cases where the first layer was a polyethylene resin, set 200° C. in the cases of polypropylene or a cycloolefin polymer, and set 250° C. in the cases of polyamide. The sealed film was cut into a strip having 15 mm width, which was used as a test piece. According to JIS Z1707 (1997), the test piece was pulled with a tensile tester [Part No: AG-IS MS, manufactured by Shimadzu Corporation] at a test speed of 300 mm/min, and strength at the time of broken was measured.

Test Method 6: Peel Test

The peel test is for the index of the prevention of bag breakage when the medical packaging film is formed into a bag and filled with the contents. Film at one side of a test piece for seal strength test prepared in the same manner as in Test Method 5 was fixed, 1 kg of a weight was attached to other side of the film and the film was allowed to stand for 48 hours, and the presence or absence of peeling was observed. The peeling was evaluated by two grades of A: No peel and B: Peeled.

The results of Test Methods 3 to 6 tire collectively shown in Table 7 and Table 8.

TABLE 7

| | Total thickness (μm) | First layer Composition (ratio) | First layer Thickness (μm) | Second layer Composition (wt ratio) | Second layer Thickness (μm) | Surface resistivity (Ω) | Electrostatic potential (kV) | Half-life (sec) | Seal strength (N/15 mm) | Peel test |
|---|---|---|---|---|---|---|---|---|---|---|
| Ex. 1 | 100 | PE1 | 10 | PE1 (80) MK400 (20) | 10 | $10^{13}$ | 0.8 | 38 | 21 | A |
| Ex. 2 | 120 | PE1 | 12 | PE1 (80) MK400 (20) | 12 | $10^{13}$ | 0.8 | 41 | 23 | A |
| Ex. 3 | 40 | PE1 | 4 | PE1 (80) MK400 (20) | 4 | $10^{13}$ | 0.7 | 24 | 12 | A |
| Ex. 4 | 100 | PE1 | 10 | PE1 (80) SD100 (20) | 10 | $10^{12}$ | 0.8 | 21 | 21 | A |
| Ex. 5 | 100 | PE2 | 10 | PE2 (88) MK400 (12) | 35 | $10^{13}$ | 0.9 | 48 | 28 | A |
| Ex. 6 | 100 | PE2 | 10 | PE2 (85) MK400 (15) | 30 | $10^{13}$ | 0.8 | 42 | 28 | A |
| Ex. 7 | 100 | PE2 | 10 | PE2 (80) MK400 (20) | 20 | $10^{13}$ | 0.7 | 38 | 28 | A |
| Ex. 8 | 100 | PE2 | 10 | PE2 (85) MK400 (15) | 10 | $10^{13}$ | 0.8 | 45 | 28 | A |
| Ex. 9 | 100 | PE2 | 10 | PE2 (75) MK400 (25) | 10 | $10^{12}$ | 0.7 | 28 | 28 | A |
| Ex. 10 | 100 | PE2 | 10 | PE2 (72) MK400 (28) | 5 | $10^{13}$ | 0.7 | 34 | 28 | A |
| Ex. 11 | 100 | PE2 | 12 | PE2 (80) MK400 (20) | 8 | $10^{13}$ | 0.7 | 45 | 28 | A |
| Ex. 12 | 100 | PE2 | 8 | PE2 (85) MK400 (15) | 5 | $10^{13}$ | 0.8 | 33 | 28 | A |
| Ex. 13 | 100 | PE2 | 8 | PE2 (80) MK400 (20) | 8 | $10^{12}$ | 0.7 | 29 | 28 | A |
| Ex. 14 | 100 | PE2 | 5 | PE2 (80) MK400 (20) | 5 | $10^{12}$ | 0.7 | 26 | 27 | A |
| Ex. 15 | 60 | PE2 | 10 | PE2 (80) MK400 (20) | 10 | $10^{13}$ | 0.7 | 35 | 20 | A |
| Ex. 16 | 100 | PE3 | 10 | PE3 (80) MK400 (20) | 10 | $10^{13}$ | 0.8 | 36 | 19 | A |
| Ex. 17 | 100 | HDPE | 10 | HDPE (80) MK400 (20) | 10 | $10^{13}$ | 0.9 | 40 | 28 | A |
| Ex. 18 | 100 | PA | 10 | PA (80) MK400 (20) | 10 | $10^{13}$ | 0.9 | 40 | 40 | A |
| Ex. 19 | 100 | PP | 10 | PP (80) MK400 (20) | 10 | $10^{13}$ | 0.9 | 40 | 30 | A |
| Ex. 20 | 100 | COP | 10 | COP (80) MK400 (20) | 10 | $10^{13}$ | 0.9 | 40 | 20 | A |
| Ex. 21 | 100 | PE1 | 10 | PE1 (80) MK400 (20) | 10 | $10^{13}$ | 0.8 | 38 | 31 | A |
| Ex. 22 | 100 | PE1 | 10 | PE1 (80) MK400 (20) | 10 | $10^{13}$ | 0.8 | 38 | 32 | A |
| Ex. 23 | 100 | PE1 | 5 | PE1 (80) MK400 (20) | 5 | $10^{12}$ | 0.8 | 27 | 21 | A |
| Ex. 24 | 100 | PE1 | 5 | PE1 (80) MK400 (20) | 5 | $10^{12}$ | 0.8 | 27 | 30 | A |
| Ex. 25 | 100 | PE1 | 5 | PE1 (80) MK400 (20) | 5 | $10^{12}$ | 0.8 | 27 | 19 | A |
| Ex. 26 | 100 | PE1 | 5 | PE1 (80) MK400 (20) | 5 | $10^{12}$ | 0.8 | 27 | 20 | A |

TABLE 8

| | Total Thickness (μm) | First layer Composition (wt ratio) | First layer Thickness (μm) | Second layer Composition (ratio) | Second layer Thickness (μm) | Surface resistivity (Ω) | Electrostatic potential (kV) | Half-life (sec) | Seal strength (N/15 mm) | Peel test |
|---|---|---|---|---|---|---|---|---|---|---|
| Comp. Ex. 1 | 100 | PE1 | 10 | PE1 (97) A52 (3) | 10 | $10^{16}$ | 2.0 | 120< | 21 | A |
| Comp. Ex. 2 | 100 | PE1 (80) MK400 (20) | 100 | — | — | $10^{10}$ | 0.1 | 1 | 17 | B |
| Comp. Ex. 3 | 100 | PE1 (80) MK400 (20) | 10 | PE1 | 80 | $10^{10}$ | 0.1 | 2 | 17 | B |
| Comp. Ex. 4 | 100 | PE1 (88) MK400 (12) | 10 | PE1 | 90 | $10^{13}$ | 0.8 | 8 | 18 | B |
| Comp. Ex. 5 | 100 | PE2 | 10 | PE2 (85) MK400 (15) | 50 | $10^{13}$ | 0.7 | 41 | 28 | A |

TABLE 8-continued

| | Total Thickness (μm) | First layer Composition (wt ratio) | First layer Thickness (μm) | Second layer Composition (ratio) | Second layer Thickness (μm) | Surface resistivity (Ω) | Electrostatic potential (kV) | Half-life (sec) | Seal strength (N/15 mm) | Peel test |
|---|---|---|---|---|---|---|---|---|---|---|
| Comp. Ex. 6 | 100 | PE2 | 10 | PE2 (80) MK400 (20) | 30 | $10^{13}$ | 0.7 | 37 | 28 | A |
| Comp. Ex. 7 | 100 | PE2 | 10 | PE2 (90) MK400 (10) | 10 | $10^{14}$ | 1.5 | 120< | 28 | A |
| Comp. Ex. 8 | 100 | PE2 | 10 | PE2 (70) MK400 (30) | 10 | $10^{12}$ | 0.7 | 23 | 28 | A |
| Comp. Ex. 9 | 100 | PE2 | 15 | PE2 (80) MK400 (20) | 10 | $10^{13}$ | 1.0 | 100 | 28 | A |
| Comp. Ex. 10 | 40 | PE2 | 10 | PE2 (80) MK400 (20) | 10 | $10^{13}$ | 0.7 | 35 | 15 | A |

As shown in Table 7 and Table 8, regarding the medical packaging films of Examples 1 to 26 to which the present invention was applied, the surface resistivity was less than $10^{14}\Omega$, the electrostatic potential was 1.0 kV or less, the half-life was 60 seconds or less, and the seal strength was from 12 to 40 (N/15 mm), which indicates that the film has a strength capable of being sufficiently filled with 20 kg of the contents in one pack, and the evaluation of the peel test was A.

On the other hand, among the films of Comparative Examples 1 to 10 to which the present invention was not applied, there were many films having the surface resistivity exceeding $10^{14}\Omega$, even though the surface resistivity was less than $10^{14}\Omega$. Comparative Examples 2 to 6, 8 and 10 showed the acid titer exceeding 1 mL in the alkali test, which indicates that the amount of the elutable alkali compound was large, Comparative Examples 2 to 4 were insufficient in the peel test as compared with Examples, and the evaluations were poor as a whole.

Consideration Method 7: Consideration of Correlation of Thickness $L_1$ μm of First Layer, Potassium Ionomer Concentration $C'_2$ vol % in Second Layer and Thickness $L_2$ μm of Second Layer Regarding the films of Examples 1 to 26 and Comparative Examples 7 and 9, the thickness $L_1$ μm of the first layer; the density $D_{2b}$ g/cm$^3$ of the base resin and the potassium ionomer concentrations $C_2$ wt % and $C'_2$ vol %, in the second layer; and the thickness $L_2$ μm of second layer are collectively shown in Table 9 and Table 10 below.

TABLE 9

| | Total thickness (μm) | First layer Thickness $L_1$ (μm) | Second layer | | | | |
|---|---|---|---|---|---|---|---|
| | | | Base resin density $D_{2b}$ (g/cm$^3$) | Potassium ionomer density $D_2$ (g/cm$^3$) | Potassium ionomer composition $C_2$ (wt %) | Potassium ionomer composition $C'_2$ (vol %) | Thickness $L_2$ (μm) |
| Ex. 1 | 100 | 10 | 0.924 | 0.965 | 20% | 19.3% | 10 |
| Ex. 2 | 120 | 12 | 0.924 | 0.965 | 20% | 19.3% | 12 |
| Ex. 3 | 40 | 4 | 0.924 | 0.965 | 20% | 19.3% | 4 |
| Ex. 4 | 100 | 10 | 0.924 | 0.985 | 20% | 19.0% | 10 |
| Ex. 5 | 100 | 10 | 0.913 | 0.965 | 12% | 11.4% | 35 |
| Ex. 6 | 100 | 10 | 0.913 | 0.965 | 15% | 14.3% | 30 |
| Ex. 7 | 100 | 10 | 0.913 | 0.965 | 20% | 19.1% | 20 |
| Ex. 8 | 100 | 10 | 0.913 | 0.965 | 15% | 14.3% | 10 |
| Ex. 9 | 100 | 10 | 0.913 | 0.965 | 25% | 24.0% | 10 |
| Ex. 10 | 100 | 10 | 0.913 | 0.965 | 28% | 26.9% | 5 |
| Ex. 11 | 100 | 12 | 0.913 | 0.965 | 20% | 19.1% | 8 |
| Ex. 12 | 100 | 8 | 0.913 | 0.965 | 15% | 14.3% | 5 |
| Ex. 13 | 100 | 8 | 0.913 | 0.965 | 20% | 19.1% | 8 |
| Ex. 14 | 100 | 5 | 0.913 | 0.965 | 20% | 19.1% | 5 |
| Ex. 15 | 60 | 10 | 0.913 | 0.965 | 20% | 19.1% | 10 |
| Ex. 16 | 100 | 10 | 0.921 | 0.965 | 20% | 19.3% | 10 |
| Ex. 17 | 100 | 10 | 0.960 | 0.965 | 20% | 19.9% | 10 |
| Ex. 18 | 100 | 10 | 1.020 | 0.965 | 20% | 20.9% | 10 |
| Ex. 19 | 100 | 10 | 0.900 | 0.965 | 20% | 18.9% | 10 |
| Ex. 20 | 100 | 10 | 1.010 | 0.965 | 20% | 20.7% | 10 |
| Ex. 21 | 100 | 10 | 0.924 | 0.965 | 20% | 19.3% | 10 |
| Ex. 22 | 100 | 10 | 0.924 | 0.965 | 20% | 19.3% | 10 |
| Ex. 23 | 100 | 5 | 0.924 | 0.965 | 20% | 19.3% | 5 |
| Ex. 24 | 100 | 5 | 0.924 | 0.965 | 20% | 19.3% | 5 |
| Ex. 25 | 100 | 5 | 0.924 | 0.965 | 20% | 19.3% | 5 |
| Ex. 26 | 100 | 5 | 0.924 | 0.965 | 20% | 19.3% | 5 |

TABLE 10

| | Total thickness (μm) | First layer Thickness $L_1$ (μm) | Second layer | | | | |
|---|---|---|---|---|---|---|---|
| | | | Base resin density $D_{2b}$ (g/cm³) | Potassium ionomer density $D_2$ (g/cm³) | Potassium ionomer composition $C_2$ (wt %) | Potassium ionomer composition $C'_2$ (vol %) | Thickness $L_2$ (μm) |
| Comp. Ex. 7 | 100 | 10 | 0.913 | 0.965 | 10% | 9.5% | 10 |
| Comp. Ex. 9 | 100 | 15 | 0.913 | 0.965 | 20% | 19.1% | 10 |

FIG. 3 shows the correlation between the thickness $L_1$ μm of the first layer and the product of $C'_2$ volt %, which is calculated from the density $D_{2b}$ g/cm³ of the base resin and the concentration $C_2$ wt % of the potassium ionomer having a density of $D_2$ g/cm³ in the second layer, and the thickness $L_2$ μm of the second layer.

As shown in FIG. 3, it was understood that the medical packaging films of Examples 1 to 26 satisfy the following formula (1) and that the potassium ionomer concentration in the second layer and the film thickness of the second layer affect the film thickness of the first layer that can exhibit the antistatic effect of the innermost layer.

$$2 \leq L_1 \leq (5 \times L_2 \times C'_2)/100 + 5 \quad (1)$$

The medical packaging films of Examples 1 to 26 are plotted in the area lower than the boundary line of first-order linear approximation y=5.00x+5.00 of x axis-y axis. On the other hand, the films of the Comparative Examples are plotted in the area upper than the boundary line. Thus, both groups are significantly distinguished to each other.

It can be induced that in the case where the thickness $L_n$ μm of the (n)th layer, the potassium ionomer concentration $C'_{n-1}$ vol % in the (n-1)th layer and the thickness $L_{n-1}$ of the (n-1)th layer satisfy the following formula (3), the potassium ionomer concentration in the (n-1)th layer and the film thickness of the (n-1)th layer affect the film thickness of the (n)th layer as the outermost layer that can exhibit the antistatic effect.

$$2 \leq L_1 \leq (5 \times L_2 \times C'_2)/100 + 5 \quad (3)$$

Consideration Method 8; Consideration of Correlation Between Potassium Ionomer Layer Ratio and Potassium Ionomer Vol % of Medical Packaging Film Regarding the films of Examples 1 to 26 and Comparative Examples 5, 6, 8 and 10, a ratio of a thickness of each potassium ionomer layer of the second layer (Examples 1 to 22 and Comparative Examples 5, 6, 8 and 10) or of the second layer and the (n-1)th layer (Examples 23 to 26) to the thickness of all layers of the medical packaging film (a ratio of the thickness of the single layer in the case where the potassium ionomer layer is a single layer or of the thickness of the two layers in the case where the potassium ionomer layer is two layers, with respect to the total layer thickness) and the potassium ionomer vol % of each potassium ionomer layer were plotted as shown in FIG. 4, and the correlation thereof was considered.

As shown in FIG. 4, the medical packaging films of Examples 1 to 26 are plotted in the area lower than the boundary line of first-order linear approximation y=-2.00x+0.62 of x axis-y axis. On the other hand, the films of the Comparative Examples are plotted in the area upper than the boundary line. Thus, both groups are significantly distinguished to each other.

It was understood from those results that the medical packaging films of Examples 1 to 26 can achieve the reduced elutable alkali component and ignition residue by adjusting the thickness of the second layer or the total thickness of the second layer and the potassium ionomer layer as the (n-1)th layer and the potassium ionomer vol % therein.

Consideration Method 9: Consideration of Correlation Between Non-Potassium Ionomer Layer Ratio and Potassium Ionomer Vol % of Medical Packaging Film Regarding the films of Examples 1 to 26 and Comparative Examples 5, 6, 8 and 10, an outer layer ratio that is a ratio of the total thickness of non-potassium ionomer layers that are the third layer to the fifth layer in the case of five or less layers to the thickness of ail layers (Examples 1 to 22 and Comparative Examples 5, 6, B and 10), or an intermediate layer ratio that is a ratio of the total thickness of non-potassium ionomer layers interposed between the second layer and the (n-1)th layer m the case of five or more layers to the thickness of the all layers (Examples 23 to 26), and the potassium ionomer vol % of the potassium ionomer layer that is the second layer or the (n-1)th layer were plotted as shown in FIG. 5, and the correlation thereof was considered.

As shown in FIG. 5, the medical packaging films of Examples 1 to 26 are plotted in the area upper than the boundary line of first-order linear approximation y=2.00x+0.25 of x axis-y axis. On the other hand, the films of the Comparative Examples are plotted in the area lower than the boundary line. Thus, both groups tire significantly distinguished to each other.

It was understood from those results that the medical packaging films of Examples 1 to 26 can achieve the reduced elutable alkali component and ignition residue by adjusting the outer layer ratio that is a non-potassium ionomer layer in the case where the film is formed of five or less layers and only the second layer contains the potassium ionomer or the intermediate layer ratio that is a ratio of the total thickness of non-potassium ionomer layers interposed between the second layer and the (n-1)th layer in the case of five or more layers, and the potassium ionomer vol %. The dust-proof laminate of Patent literature 1 is plotted in the area lower than the boundary line similar to the Comparative Examples.

The medical packaging films of Examples 1 to 26 to which the present invention was applied can achieve the reduced elutable alkali component and ignition residue by adjusting the thickness of the potassium ionomer layer and non-potassium ionomer layer, the lamination position and the potassium ionomer concentration, and are useful for packaging a medicine and a drug substance thereof. Furthermore, the elutable alkali component hardly bleeds-out at all and antistatic performance can be sufficiently exhibited while maintaining high quality of the medicine and the drug substance thereof.

On the other hand, the films of Comparative Examples 1 to 10 contain a large amount of the elutable alkali component and are easy to cause bleed-out, similar to the conventional films, and there is a possibility that high quality of a medicine or a drug substance thereof cannot be maintained.

Although the present invention has been described in detail and by reference to the specific embodiments, it is apparent to one skilled in the art that various modifications or changes can be made without departing from the spirit and scope of the present invention. This application is based on Japanese Patent Application (No. 2016-94198) filed on May 9, 2016, the disclosure of which is incorporated herein by reference in its entity. Furthermore, all references cited herein are incorporated therein in their entities.

INDUSTRIAL APPLICABILITY

The medical packaging film of the present invention is useful as a medical antistatic film, does not contaminate a medical drug as contents, such as a medicine or a drug substance thereof, achieves prevention of accident such as dust explosion, and can safely accommodate, store and transport a medical drug.

REFERENCE SIGNS LIST 1 is a medical packaging film.

The invention claimed is:

1. A medical packaging film comprising a laminate of at least three layers,
wherein the laminate comprises: a first layer that is an innermost layer in contact with a medicine and formed of a no-antistatic agent-containing thermoplastic resin formation layer;
a second layer formed of a polymer antistatic agent-containing thermoplastic resin formation layer comprising a polymer antistatic agent that is a potassium ionomer in an amount of C wt % ($10<C<30$) in a single layer; and
a third layer that is formed of a thermoplastic resin formation layer, and the laminate provides an amount of a water-elutable alkali component being at most 0.01 mmol equivalent per 5 g in total of 1 cm$^2$ pieces, and
wherein the first layer has a thickness of $L_1$ μm, the second layer has a potassium ionomer concentration of $C'_2$ vol % and the second layer has a thickness of $L_2$ μm, satisfying the following formula (1):

$$2 \leq L_1 \leq (5 \times L_2 \times C'_2)/100 + 5 \tag{1}$$

2. The medical packaging film according to claim 1, wherein the polymer antistatic agent is a potassium ionomer of an ethylene-unsaturated carboxylic acid copolymer in which ethylene is copolymerized with an unsaturated carboxylic acid.

3. The medical packaging film according to claim 1, wherein the laminate is a laminate of from three to five thermoplastic resin formation layers and only the second layer contains the potassium ionomer.

4. The medical packaging film according to claim 3, wherein the first layer has the thickness of $L_1$ μm; the second layer contains a base resin having a density of $D_{2b}$ g/cm$^3$ and the potassium ionomer having a density of $D_2$ g/cm$^3$ and having concentrations of $C_2$ wt % and $C'_2$ vol %; and the second layer has the thickness of $L_2$ μm, satisfying the above formula (1) and the following formula (2):

$$C'_2/100=(C_2/D_2)/[(100-C_2)/D_{2b}+C_2/D_2] \tag{2}$$

5. The medical packaging film according to claim 1, wherein the laminate is a laminate of at least five thermoplastic resin formation layers, and each of the second layer and a (n−1)th layer in contact with the inside of a (n)th layer that is the outermost layer comprises the potassium ionomer in an amount of C wt % ($10<C<30$) in a single layer.

6. The medical packaging film according to claim 5, wherein the first layer has the thickness of $L_1$ μm; the second layer contains a base resin having a density of $D_{2b}$ g/cm$^3$ and the potassium ionomer having a density of $D_2$ g/cm$^3$ and having concentrations of $C_2$ wt % and $C'_2$ vol %; and the second layer has the thickness of $L_2$ μm, satisfying the above formula (1) and the following formula (2), and wherein the (n)th layer has a thickness of $L_n$ μm; the (n−1)th layer contains a base resin having a density of $D_{(n-1)b}$ g/cm$^3$ and the potassium ionomer having a density of $D_{n-1}$ g/cm$^3$ and having concentrations of $C_{n-1}$ wt % and $C'_{n-1}$ vol %; and the (n−1)th layer has a thickness of $L_{n-1}$ μm, satisfying the following formula (3) and formula (4):

$$C'_2/100=(C_2/D_2)/[(100-C_2)/D_{2b}+C_2/D_2] \tag{2}$$

$$2 \leq L_n \leq (5 \times L_{n-1} \times C'_{n-1})/100 + 5 \tag{3}$$

$$C'_{n-1}/100=(C_{n-1}/D_{n-1})/[(100-C_{n-1})/D_{(n-1)b}+C_{n-1}/D_{n-1}] \tag{4}$$

7. The medical packaging film according to claim 1, showing an ignition residue of at most 1%.

8. The medical packaging film according to claim 1, wherein the laminate has the innermost layer having a surface resistivity of less than $10^{14} \Omega$, an electrostatic potential of at most 1.0 kV and a half-life thereof of at most 60 seconds.

9. The medical packaging film according to claim 1, wherein the laminate has a peeling strength such that when the innermost layer is heat-sealed to itself with a width of 15 mm to prepare a test piece of the laminate and a load of 1 kg is attached to one side of the test piece, the innermost layer does not peel apart after being allowed to stand for 48 hours.

10. The medical packaging film according to claim 1, wherein the thicknesses of the first layer and the second layer are thinner than at least one of the thickness of any one of the other layers and the total thickness of the other layers.

11. The medical packaging film according to claim 1, wherein the laminate is a packaging sheet, or a packaging bag in which one or two of the laminates are heat-sealed to each other at the innermost layer.

* * * * *